United States Patent [19]
Chasteen et al.

[11] Patent Number: 5,343,847
[45] Date of Patent: Sep. 6, 1994

[54] ELECTRONIC GASEOUS FUEL INJECTION SYSTEM

[75] Inventors: Ronald E. Chasteen; Sean O. Harnett; Terry L. Cornelison, all of Washington, Mo.

[73] Assignee: Pacer Industries, Inc., Washington, Mo.

[21] Appl. No.: 120,286

[22] Filed: Sep. 13, 1993

[51] Int. Cl.$^5$ ............................................. F02M 21/04
[52] U.S. Cl. ..................................... 123/527; 123/468
[58] Field of Search .......... 123/525, 526, 527, 27 GE, 123/DIG. 12, 468

[56] References Cited

U.S. PATENT DOCUMENTS

| | | | |
|---|---|---|---|
| 4,831,993 | 5/1989 | Kelgard | 123/27 GE |
| 5,052,360 | 10/1991 | Ingle, III et al. | 123/527 |
| 5,183,011 | 2/1993 | Fujii et al. | 123/DIG. 12 |
| 5,228,423 | 7/1993 | Oikawa et al. | 123/525 |
| 5,291,869 | 3/1994 | Bennett | 123/527 |

FOREIGN PATENT DOCUMENTS 58-877152   5/1983   Japan .................................. 123/527
0198762   8/1988   Japan ........................... 123/DIG. 12

*Primary Examiner*—E. Rollins Cross
*Assistant Examiner*—Erick Solis
*Attorney, Agent, or Firm*—Richard W. Hanes

[57] ABSTRACT

A gaseous fuel delivery system for an internal combustion engine having at least one cylinder with fuel intake and exhaust gas ports and an ignition system and having a controlled air intake system for each of the cylinders of the engine which includes a source of gaseous fuel, a fuel plenum having at least one fuel atomizer nozzle for each cylinder of the engine, where each nozzle is in communication with the air intake system proximate the intake port in each cylinder, a fuel flow rate control device connected between the source of gaseous fuel and the fuel plenum which contains an electronic control unit having a plurality of optimum fuel/air mixture variables as inputs and a modulated pulse width output connected to a linear d.c. motor, the shaft stroke of which controls the operation of a fuel valve for regulating the flow of fuel from the gaseous source to the fuel plenum.

5 Claims, 3 Drawing Sheets

ELECTRONIC GASEOUS FUEL INJECTION SYSTEM

The present invention relates to electronic fuel injection systems for internal combustion engines using gaseous fuels such as liquid petroleum gas (LPG) or compressed natural gas (CNG).

BACKGROUND

Electronic fuel control for internal combustion engines having fuel injectors has primarily been involved with means and methods of controlling cycle injection timing and the fuel injector open duration. To implement these controls on liquid fuel devices it is necessary to utilize fuel injectors for each cylinder of the engine. The high cost of electronic fuel injectors has created a need for a less expensive alternative and, in accordance with the present invention, such a choice is available for engines which use gaseous fuels such as LPG or CNG.

Therefore, the primary object of the present invention is to provide an electronically controlled fuel injection system for gaseous fuels which eliminates cylinder specific electronically controlled fuel injectors and the appurtenant wiring to each cylinder.

A further object of the invention is to provide a single fuel line to a fuel delivery plenum, or fuel rail, in an internal combustion engine which uses gaseous fuel, in which the fuel flow rate in the single fuel line is electronically controlled by a closed loop control system capable of adjusting to an optimum fuel flow rate in accordance with the demands of a plurality of engine operating conditions.

Another object of the invention is to provide a means for controlling gaseous fuels to internal combustion engines in a manner which will deliver the correct fuel quantity to achieve the optimum fuel/air ratio for the instant operating condition of the engine, while at the same time reducing unwanted exhaust emissions.

A still further object of the invention is to provide means for delivering gaseous fuels to an internal combustion engine with the same sophistication and precision as has been done with gasoline delivery systems, but with substantially reduced costs.

Other and further objects, features and advantages of the invention will become apparent upon a reading of the following description of a preferred form of the invention.

SUMMARY OF THE INVENTION

The present invention provides apparatus for electronically controlling fuel delivery to an internal combustion engine where the fuel is of a gaseous type such as liquid petroleum gas (LPG) or compressed natural gas (CNG) or others. The apparatus of the invention lends itself not only to original manufacture installations but also to the retrofit of existing liquid fuel injected engines. Instead of traditional fuel injectors, the apparatus of the present invention utilizes atomizer nozzles connected to a common fuel plenum, or fuel rail, which obtain gaseous fuel through a fuel line connected to an electronic fuel flow control unit. The flow control contains a linear motor which opens and closes a fuel valve that regulates the fuel flow into the fuel rail as a function of multiple variables. Many of the variables, such as temperature of various operating elements are input into the control system in an open loop type of system. However, two of the controlling variables are input to the control unit though a closed loop feedback system. The closed loop inputs include a signal representing the oxygen content of the engine exhaust gas and a signal representing the difference between the instantaneous fuel flow being measured in the control unit and the predetermined optimum fuel flow for the then instantaneous engine operating conditions of load and rotational speed.

DETAILED DESCRIPTION

Figure 1:
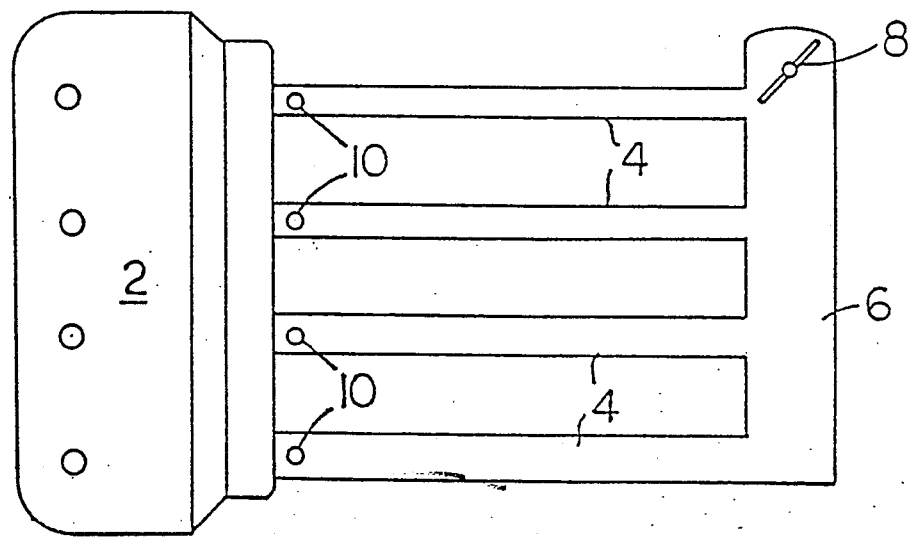
FIG. 1 is a diagrammatic illustration of the intake manifold assembly on an engine employing the fuel injection system of the present invention, showing the engine and manifold in block diagram form.

A typical internal combustion engine comprising cylinders (four), pistons, valves, ignition means and crankshaft is depicted generally in FIG. 1 by the reference numeral 2. Air is delivered to each of the engine's cylinders by separately tuned runners 4 which are in fluid communication with an air plenum 6. Air flow to the plenum is controlled by a throttle or butterfly valve 8 positioned at the head end on the plenum. In a typical fuel injected engine, electronic fuel injectors are positioned in ports 10 of the tuned fuel runners 4, however in the apparatus of the present invention the electronic fuel injectors are each replaced with an inexpensive atomizer nozzle 12, which can amount to no more than an aluminum tube having a fuel conducting bore through its length. The fuel delivery end of each atomizer nozzle is positioned very close to the intake valve of the engine cylinder to which it pertains.

Figure 2:
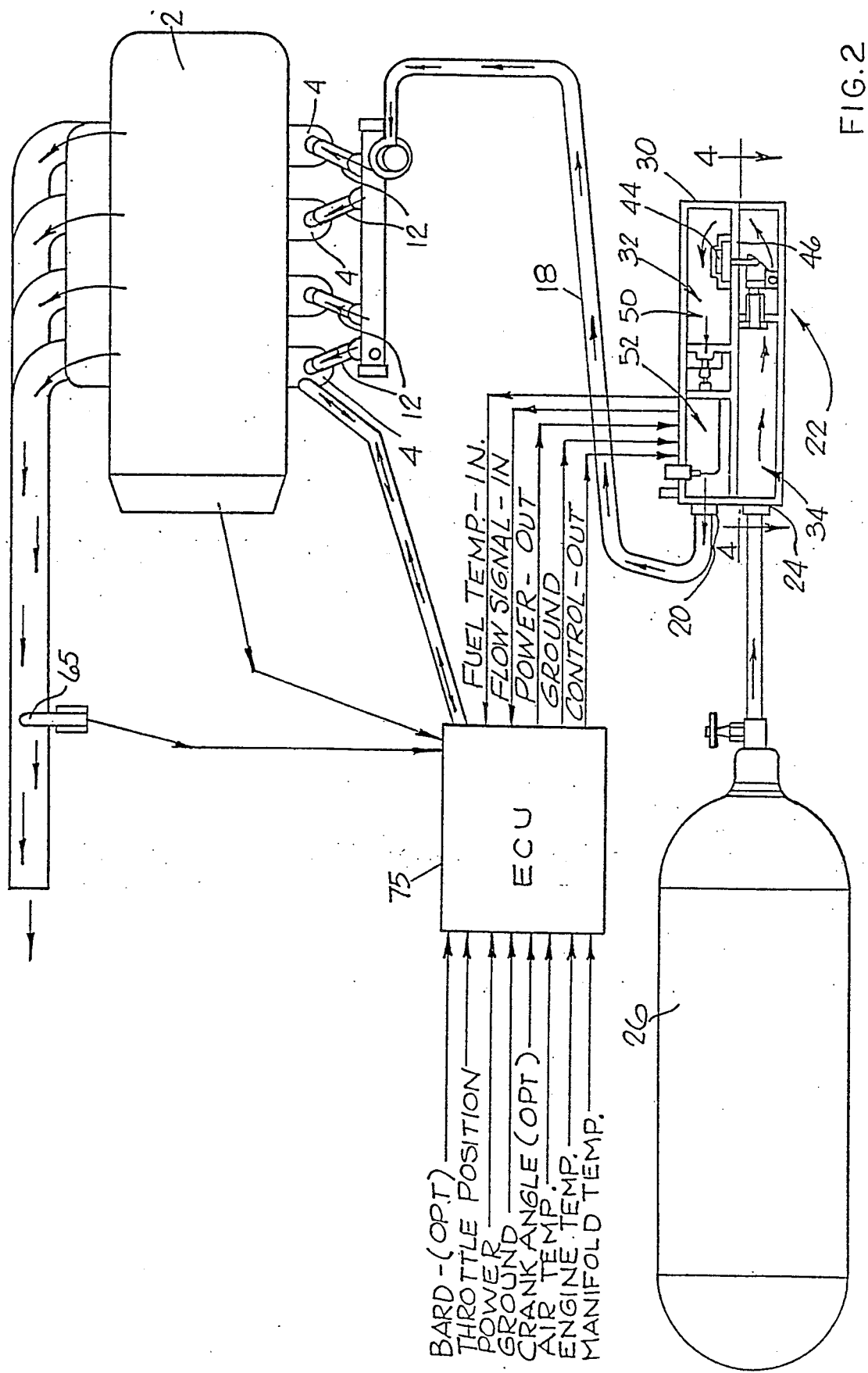
FIG. 2 is a schematic diagram illustrating the various components of the fuel flow system of the present invention and their interconnections with one another.

Referring now to FIG. 2, the fuel intake end of each atomizer nozzle is connected to be in fluid communication with a fuel rail 14. The fuel rail is connected to one end of a fuel line 18, the other end of which fuel line is attached to the fuel output port 20 of a fuel flow control unit 22. Fluid fuel, either liquid or gas, from a tank 26 containing liquid petroleum gas, compressed natural gas or some other type of gaseous engine fuel may be in liquid form when first introduced into the flow control unit at intake port 24.

Figure 4:
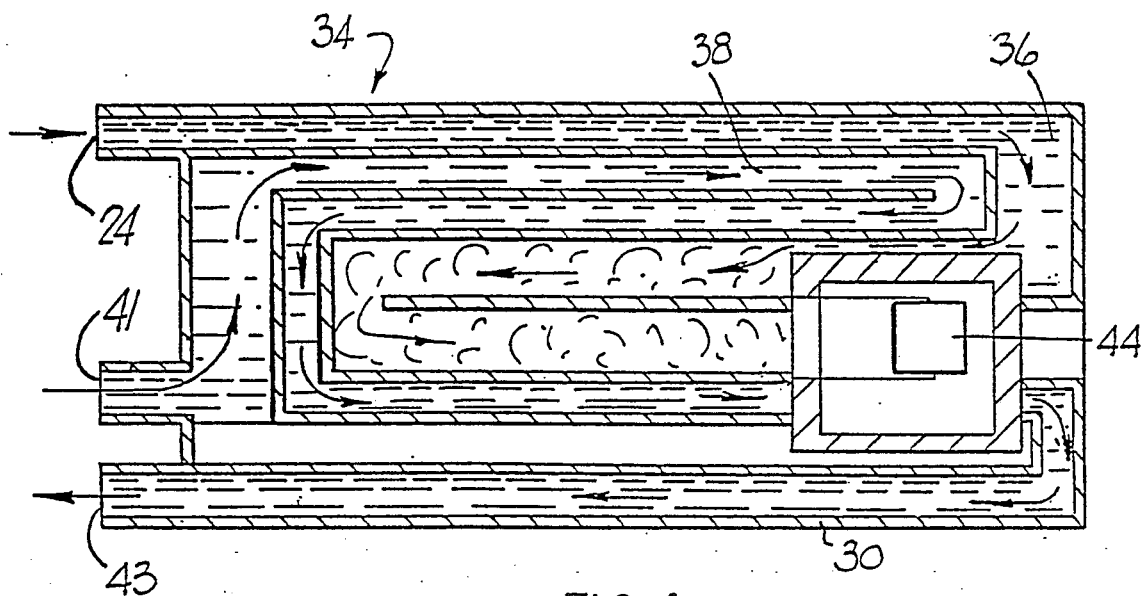
FIG. 4 is a cross sectional view of the fuel flow control unit taken along lines 4—4 of FIG. 2.

The fuel flow control unit 22 comprises a housing 30 which is horizontally divided into upper and lower compartments 32 and 34. A view of the lower compartment is seen best in FIG. 4. The lower compartment 34 is subdivided into two independent and separated "mazes" 36 and 38. The fuel maze 36 communicates with the fuel input port 24. The hot fluid maze 38 is interlaminated with the fuel maze 36 in order to achieve maximum heat transfer from a hot fluid circulating therein, such as engine coolant or exhaust gas, entering the maze at port 41 and exiting at port 43. The purpose of heating the fuel is to vaporize it if the fuel is in a liquid form entering the fuel flow control unit intake port 24. The fuel maze 36 terminates in a pressure regulator 44 carried by the partition 46 which separates the upper and lower compartments of the control unit 22. As fuel is passed through the regulator 44 its pressure is reduced to that appropriate for the engine to which the system is attached, for example in the range of 4 to 7 psi.

Figure 5:
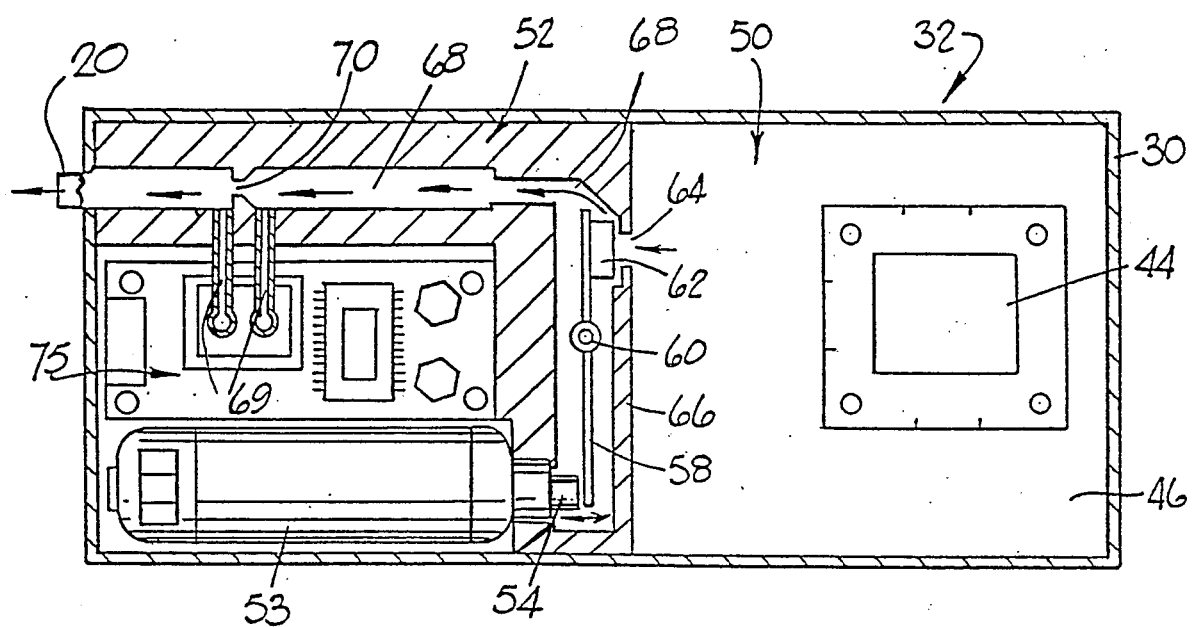
FIG. 5 of a top view of the interior of the fuel flow control unit.

As seen best in FIG. 5, the upper compartment 32 is subdivided into a fuel retention cavity 50 and a hardware and fuel conduit cell 52. Within the cell 52 is mounted an electronic control unit (ECU) 75 and a linear d.c. motor 53 having an axially moving spindle 54. The distal end of the spindle 54 is connected to one end of a lever 58 which pivots about a fulcrum 60. The other end of the lever is attached to a valving device 62 which variably opens and closes a port 64 in the upper compartment partition 66 so as to regulate the rate of fuel flow from the cavity 50 into a fuel conduit 68, also located in the cell 52. The fuel conduit 68 is connected to and is in fluid communication with the fuel line 18 through the fuel output port 20 in the side of the fuel control unit 22.

The winding of the linear motor is excited with a series of electrical pulses produced by the electronic control unit 75 at a frequency of 120 Hertz, for example. By the technique of pulse width modulation the width of the pulses is varied by the ECU as a function of the inputs to the ECU which together manipulate and control the rate of fuel flow. The extension of the spindle 54 and the resulting actuation of the valve lever 58 and opening of the fuel valve 62 depends upon the duty cycle of the motor. If the duty cycle is 100% the spindle is extended to its maximum and the fuel valve is also opened to its maximum extent. However, if the duty cycle is less than 100%, the spindle will be extended proportionately, as a percentage of the duty cycle. For example, if the pulse width is made by the ECU to be five milliseconds at the pulse frequency of 120 Hz, the duty cycle is the product of the two, or 60%, and the spindle is extended six tenths of its maximum extension with the same percentage of possible opening of the fuel valve 62. The fuel valve opening is a linear function of the width of the pulses being generated by the electronic control unit.

Figure 3:
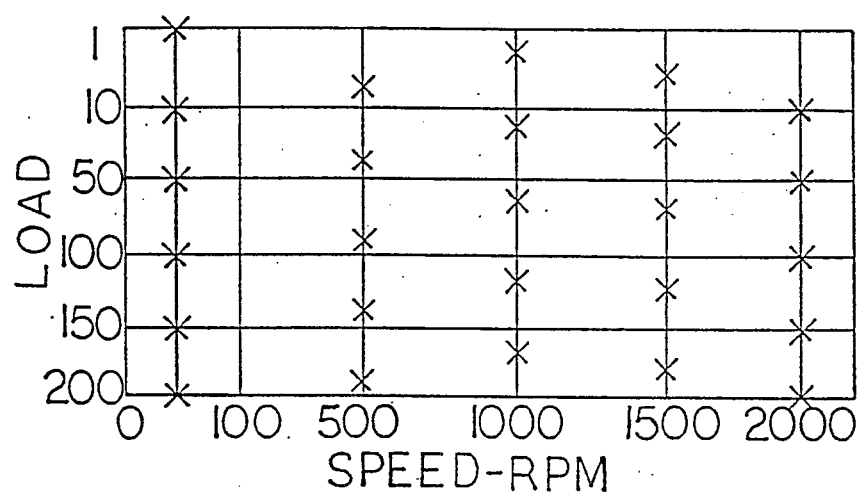
FIG. 3 is a diagrammatic look up table of optimum fuel flow values having absolute manifold pressure and engine rotational speed as its variables displayed on the ordinate and abscissa respectively.

In series with the fuel conduit 68 is a fuel flow sensor 69 having an electrical output which provides a signal representative of the rate of fuel flow through the fuel conduit 68. The flow sensor comprises an orifice 70 in the fuel path and the sensor measurers the pressure on each side of the orifice, the differential pressure being an indication of the rate of fuel flow through the orifice. The generated rate signal is communicated in a conventional manner to the electronic control unit 75 (FIG. 2). In a manner well known, the flow rate signal is amplified, processed and compared to an predetermined optimum fuel flow rate for the existing engine load and engine speed conditions, as that optimum value exists in a stored digital array, such as the one illustrated in FIG. 3. The difference between the actual fuel flow rate, as measured by the flow meter 69, and the optimum rate, as derived from the look up table of FIG. 3, for the engine conditions at any given instant, is transmitted in the form of a feedback correction signal to the linear motor 53 which adjusts the opening of the fuel valve 62 to either increase or decrease the fuel flow through the port 64 in order to bring the actual fuel flow into equilibrium with the optimum fuel flow for the existing condition of the engine.

The fuel flow is also controlled by a second feedback signal from an oxygen sensor 65 positioned in the exhaust stack of the engine. The oxygen sensor becomes determinative of whether or not the air/fuel ratio is stoichiometric and transmits a signal to the electronic control unit that is proportional to the excess oxygen in the products of combustion in the exhaust stack. Responsive to this signal from the oxygen sensor, the ECU further adjusts the output pulse width and the resultant fuel flow to fine tune the mixture for emissions purposes.

Other variables which effect the actual optimum fuel flow for the operating conditions of the engine, such as air temperature, fuel temperature, engine temperature and manifold temperature are electronically measured and representative signals are generated which are communicated to the electronic control unit to further modify the optimum fuel flow rate, as shown by the indicated inputs to the ECU 75 in FIG. 2.

As a function of the various voltage inputs to the ECU and its continuous output of width modulated pulses, the linear motor is constantly being adjusted to provide a proper fuel flow of gaseous fuel to the fuel rail 14. A continuous supply of fuel to the fuel rail is directed into the atomizer nozzles 12 which in turn supply the fuel directly to the intake ports of the internal combustion engine 2.

We claim:

1. A gaseous fuel delivery system for an internal combustion engine having at least one cylinder with fuel intake and exhaust gas ports and an ignition system and having a controlled air intake system for each of the cylinders of the engine, comprising;
   a source of gaseous fuel in fluid form,
   a fuel plenum having at least one fuel atomizer nozzle for each cylinder of the engine, where each nozzle is in communication with the air intake system proximate the intake port in each cylinder,
   fuel flow control means connected between the source of gaseous fuel and the fuel plenum, said control means having,
   an electrically controlled linearly operating fuel valve for regulating the flow of fuel from the gaseous source to the fuel plenum, and
   electronic control means having a plurality of inputs and an output connected to the linearly operating fuel valve.

2. The combination of claim 1 where the fuel flow control means further comprises;
   a fuel flow sensor downstream of the fuel valve having an electrical signal output representative of an actual fuel flow rate,
   memory means having stored therein an array of fuel flow rate values which are addressed as a function of the engine load and the engine rotational speed,
   comparison means responsive to the electrical signal representative of the actual fuel flow rate and an electrical signal derived from the stored array of optimum fuel flow rates to determine the difference therebetween, and
   feedback means interconnecting the linearly operating fuel valve and the comparison means for adjusting the fuel valve as a function of the said difference.

3. The combination of claim 2 and further including, oxygen sensing means disposed in the exhaust system to detect the amount of oxygen in the engine exhaust and having an electrical output signal representative of the oxygen content of the exhaust, means connecting the output signal of the oxygen sensing means to an input of the electronic control means for influencing the output thereof as a function of a measured departure of the fuel being consumed by the engine from a stoichiometric fuel/air ratio.

4. The combination of claim 3 where the fuel flow control means further comprises, a housing having high and low pressure compartments and where the high pressure compartment is connected to the fuel source and the low pressure compartment is in communication with the fuel valve, and fuel pressure regulator means disposed between the two compartments to provide pressure regulated fuel flow therebetween.

5. The combination of claim 4 and further including, means circulating hot fluid through the high pressure compartment, heat exchanger means disposed in the high pressure compartment for transferring heat energy from the hot fluid to the fluid from the fuel source to vaporize the fuel prior to its passing through the fuel pressure regulator means.

* * * * *